May 5, 1959
M. J. CAFIERO
2,885,461
EXPANSION AND DEFLECTION CONDUIT COUPLING
Filed Feb. 5, 1958
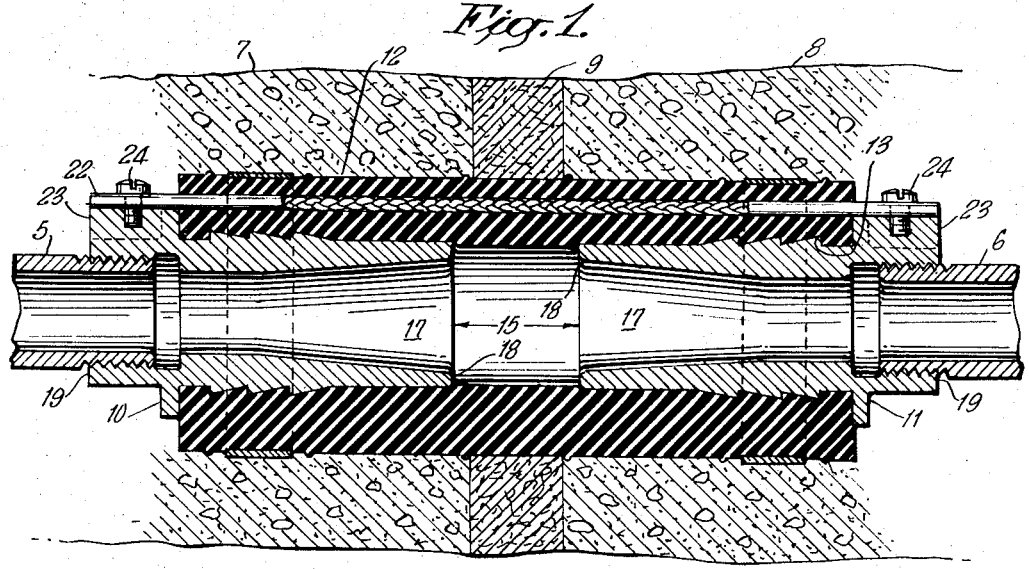
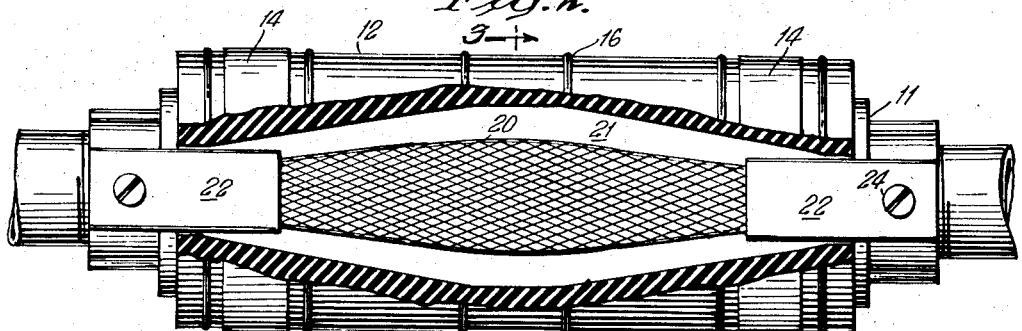
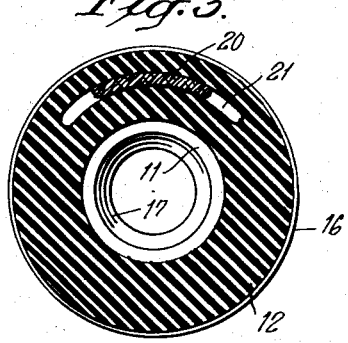
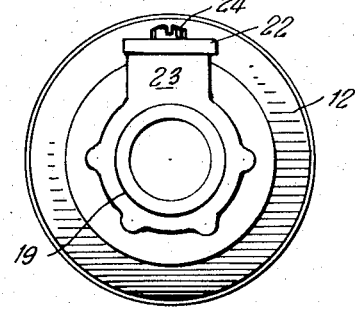
INVENTOR
MICHAEL J. CAFIERO
BY
ATTORNEY

2,885,461

EXPANSION AND DEFLECTION CONDUIT COUPLING

Michael J. Cafiero, Brooklyn, N.Y.

Application February 5, 1958, Serial No. 713,490

2 Claims. (Cl. 174—84)

The invention herein disclosed relates to couplings for connecting sections of electric conduit and the general objects of the invention are to provide a coupling which will compensate and allow for expansion, contraction and deflection such as might be caused by offsetting or twisting of the conduit at opposite ends of the coupling, and which under all circumstances will provide the necessary electric continuity required for electric raceways.

Joints having such attributes are particularly necessary for connecting lengths of conduit across expansion joints in concrete structures and for connecting sections of conduit which may be embedded in or connected to adjoining but separated concrete or other structures.

Special objects of the invention are to provide couplings suitable for such needs, which can be produced at reasonable cost, which can be readily installed and which will be durable and lasting in character.

Special objects also are to provide a coupling which will allow for the maximum deflection or deviation from alinement without injury or strain to any of the parts and in all instances will provide a full clear raceway for the cables or wires introduced through the conduit.

Other desirable objects and the novel features through which the purpose of the invention are attained are set forth and will appear in the course of the following specification.

The drawing accompanying and forming part of the specification is illustrative of a present practical embodiment of the invention but it will be appreciated that structure and arrangement may be modified and changed as regards immediate illustration, all within the true intent and scope of the invention as hereinafter described and claimed.

Figure 1 in the drawing is a broken longitudinal sectional view of one of the couplings used for connecting conduit across an expansion joint between concrete or other such structures;

Figure 2 is a broken plan view of the coupling sectioned to show the expansible and contractible jumper connecting the end sleeves which are applied to the conduit;

Figure 3 is a mid length cross sectional view of the coupling on substantially the plane of line 3—3 of Fig. 2;

Figure 4 is an end view of the coupling.

The invention is here shown used as a fitting for connecting sections of a conduit 5 and 6, embedded in concrete bodies 7, 8, separated by an expansion joint 9.

This fitting is made up of two end sleeves or collars 10, 11, yieldingly connected in spaced apart end to end relation by a surrounding flexible elastic sleeve or tube 12, of tough durable material, such as molded neoprene, rubber or flexible plastic.

Also it is to be noted that this flexible resilient sleeve is thick-walled to withstand attrition and pressure.

The connecting sleeve is shown as securely gripped and anchored on the conduit engaging collars by provision of the latter with saw-toothed teeth or ridges 13. As a further measure of security the ends of the sleeve may be clamped down over the tooth or roughened neck portions of the collars by surrounding clamp bands 14, which may be of the screw secured type, welded or mechanically connected. Additionally or as a possible substitute for the clamps the sleeve may be secured to the collars by a suitable weather-proof cement.

A possible further variation of the connection between the resilient sleeve and the end couplings is to mold this sleeve in place over the neck portions of these coupling elements.

The connecting sleeve is heavy and strong enough to hold the end collars in opposed aligned end to end relation and separated by a gap 15 which may be equal to or usually somewhat greater than the width of an ordinary expansion joint.

Preferably, the connecting sleeve is marked externally to indicate where the gap between the end collars is located, as by means of the spaced ridges 16 illustrated in Fig. 2, and which show to the contractor just where and how the fitting should be placed.

To provide full clear continuity of the raceway through the joint despite any expansion, contraction or variation in angularity, the end sleeves or collars are preferably flared or belled inwardly toward their inner ends, as indicated at 17, Fig. 1, thus to readily funnel any wire or cable passed through the joint. Fig. 1 also shows how the inner ends of the sleeves are rounded at 18 to avoid any possible obstruction to or wear or strain on any wires or cable.

The outer ends of the sleeves or collars 10, 11 are equipped for direct connection with the conduit, in the case illustrated, by having externally located screw threaded sockets 19 to receive the screw threaded ends of the joined lengths of conduit.

Electrical continuity of the raceway across the joint is afforded in the illustration by an expansible and contractible flexible jumper made up of copper braid 20, Fig. 2, located in and extending through a longitudinal passage 21 in the wall of the connecting sleeve and having terminal plates 22 at the ends projecting from the sleeve and secured to lugs or pads 23 on the end collars as by screws 24. These lugs or pads are shown in Figs. 1 and 4 as extended beyond the ends of the connecting sleeve and elevated into substantial alignment with the ends of the passage 21 in this sleeve so that the terminal plates at the ends of the braid will seat flat on the pads and be held by the screws in full contact engagement with the pads, assuring proper electrical continuity across the joint. The direct engagement of the conduit sections 5 and 6 in the screw seats 19 provided in the projecting ends of the coupling sleeves is a further safety factor insuring continuous electrical conductivity.

To afford fullest possibility for expansion, contraction and deviation, the copper braid is shown as spread or opened up in its mid-portion, Figs. 2 and 3, and the passage 21 in the wall of the sleeve is shown as widened mid-length in arcuate cross section to permit free and full expansion and contraction of the braid in accordance with expansive, contractive and angular movements of the coupling.

As a possible variation in construction the flexible expansive jumper may be molded in place in the body of the resilient connecting sleeve.

All parts of the coupling are of a durable lasting character and strong enough to stand all conditions to which it may be subjected.

It is water-tight, weather-proof, and with the metal parts made of bronze or the like, entirely rust proof and non-corrosive.

The expansive and flexible part of the bond connecting the ends of the fitting is fully protected against external and internal wear or abrasion and maintained free to accommodate for all possible variations of the joint, arising from deflection, misalinement and the like.

In addition to other properties, the invention serves as a vibration damper preventing vibration in one section of conduit being transmitted to an adjoining section of conduit.

I claim:

1. An expansion and deflection joint for connecting lengths of conduit imbedded in concrete across an expansion joint separating the sections in which the lengths of conduit are imbedded and comprising conduit coupling end sleeves in aligned, end to end relation separated a distance approximating the width of a concrete expansion joint between the concrete sections and a short stiff connecting sleeve of flexible, resilient material fixedly secured over the inner opposing end portions of said coupling sleeves and securing them together in aligned closely opposed relation, said coupling sleeves projecting at their outer ends beyond the ends of said connecting sleeve and having in their projecting ends conduit receiving screw sockets by which the coupling sleeves may be directly connected to the separated lengths of conduit, said coupling sleeves having smooth internal surfaces the full diameter of the conduit and flared outwardly toward their inner ends and terminating in rounded edges providing free uninterrupted passage for wiring introduced through the conduit, terminal pads on the exposed projecting outer end portions of the coupling sleeves, the connecting sleeve having a passage in the wall of the same in substantial alignment with said terminal pads and a flexible conductor extending through said passage and having terminal plates secured in mechanical and electrical engagement with said pads.

2. The invention according to claim 1 in which said connecting sleeve is provided on the intermediate portion of the same with an external marker in line with the separation between the inner ends of the coupling sleeves designating the proper location of the joint in respect to an expansion joint between concrete sections in which the deflection joint is to be imbedded.

References Cited in the file of this patent

UNITED STATES PATENTS

| | | |
|---|---|---|
| 1,223,864 | French | Apr. 24, 1917 |
| 2,003,586 | Erling | June 4, 1935 |
| 2,784,989 | Krupp | Mar. 12, 1957 |
| 2,831,071 | Taylor | Apr. 15, 1958 |

FOREIGN PATENTS

| | | |
|---|---|---|
| 28,720 | Great Britain | Dec. 10, 1910 |